United States Patent
Lapeyre et al.

(10) Patent No.: US 11,042,379 B2
(45) Date of Patent: Jun. 22, 2021

(54) APPARATUS AND METHOD FOR PROVIDING DECODED INSTRUCTIONS FROM A DECODED INSTRUCTION CACHE

(71) Applicant: Arm Limited, Cambridge (GB)

(72) Inventors: Eddy Lapeyre, Antibes (FR); Guillaume Bolbenes, Antibes (FR); Houdhaifa Bouzguarrou, Valbonne (FR); Luc Orion, Mouans Sartoux (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/575,659

(22) Filed: Sep. 19, 2019

(65) Prior Publication Data
US 2020/0110610 A1 Apr. 9, 2020

(30) Foreign Application Priority Data
Oct. 5, 2018 (GB) .................................... 1816244

(51) Int. Cl.
G06F 9/38 (2018.01)
G06F 9/30 (2018.01)

(52) U.S. Cl.
CPC ........ G06F 9/3804 (2013.01); G06F 9/30145 (2013.01)

(58) Field of Classification Search
CPC .................................................. G06F 9/30145
See application file for complete search history.

(56) References Cited

U.S. PATENT DOCUMENTS

| | | | | |
|---|---|---|---|---|
| 5,615,375 A | * | 3/1997 | Ibusuki | G06F 9/32 710/264 |
| 6,012,125 A | * | 1/2000 | Tran | G06F 9/382 711/125 |
| 6,493,821 B1 | * | 12/2002 | D'Sa | G06F 9/30174 712/239 |

(Continued)

OTHER PUBLICATIONS

B. Solomon, A. Mendelson, D. Orenstein, Y. Almog, and R. Ronen. Micro-Operation Cache: A Power Aware Frontend for Variable Instruction Length ISA. In IEEE Transactions On Very Large Scale Integration (VLSI) Systems, vol. 11, No. 5, Oct. 2003; pp. 801-811 (Year: 2003).*

(Continued)

*Primary Examiner* — Keith E Vicary
(74) *Attorney, Agent, or Firm* — Nixon & Vanderhye P.C.

(57) ABSTRACT

A decoding apparatus has fetch circuitry, decode circuitry, and a decoded instruction cache. The decoded instruction cache comprises a plurality of cache blocks, where each cache block is arranged to store up to P decoded instructions from at least one fetch granule allocated to that cache block. When the corresponding decoded instruction for a required instruction is already stored in the decoded instruction cache, the decoded instruction is output in the stream of decoded instructions. Allocation circuitry is arranged, when a cache block is already allocated for existing decoded instructions from a particular fetch granule, and then additional decoded instructions from that particular fetch granule are subsequently produced by the decode circuitry due to a different path being taken through the fetch granule, to update the already allocated cache block to provide both the existing decoded instructions and the additional decoded instructions.

19 Claims, 9 Drawing Sheets

(56) References Cited

U.S. PATENT DOCUMENTS

| | | | |
|---|---|---|---|
| 6,647,462 B1 | 11/2003 | Miretsky et al. | |
| 2003/0009620 A1* | 1/2003 | Solomon | G06F 1/3243 |
| | | | 711/118 |
| 2009/0249036 A1* | 10/2009 | Rappoport | G06F 1/3203 |
| | | | 712/220 |
| 2010/0138608 A1* | 6/2010 | Rappoport | G06F 12/1045 |
| | | | 711/123 |
| 2015/0039859 A1* | 2/2015 | Abdallah | G06F 9/3887 |
| | | | 712/206 |
| 2015/0100763 A1 | 4/2015 | Holm | |
| 2016/0202985 A1 | 7/2016 | Lin | |
| 2017/0177366 A1* | 6/2017 | Kothinti Naresh | G06F 9/3016 |
| 2018/0129629 A1* | 5/2018 | Sadasivam | G06F 12/0893 |
| 2018/0165096 A1* | 6/2018 | Suggs | G06F 12/0862 |
| 2018/0246718 A1* | 8/2018 | Lin | G06F 9/3804 |
| 2019/0188142 A1* | 6/2019 | Rappoport | G06F 9/3017 |
| 2020/0019406 A1* | 1/2020 | Kalamatianos | G06F 9/30145 |
| 2020/0285466 A1* | 9/2020 | Kotra | G06F 9/3016 |

OTHER PUBLICATIONS

T. Weiyu, R. Gupta, and A. Nicolau, "Power Savings in Embedded Processors through Decode Filter Cache," Proc. Design, Automation and Test in Europe Conf. and Exhibition, pp. 443-448, 2002. (Year: 2002).*

Kugan Vivekanandarajah, Thambipillai Srikanthan and Saurav Bhattacharyya, "Decode filter cache for energy efficient instruction cache hierarchy in super scalar architectures," ASP-DAC 2004: Asia and South Pacific Design Automation Conference 2004, Yohohama, Japan, 2004, pp. 373-379 (Year: 2004).*

Kotra, Jagadish B., and John Kalamatianos. "Improving the Utilization of Micro-operation Caches in x86 Processors." 2020 53rd Annual IEEE/ACM International Symposium on Microarchitecture (MICRO); 13 pages (Year: 2020).*

Combined Search and Examination Report for GB1816244.6, dated Mar. 26, 2019, 6 pages.

* cited by examiner (WITHOUT DESCRIBED TECHNIQUE)

(WITH DESCRIBED TECHNIQUE)

(WITHOUT DESCRIBED TECHNIQUE)

(WITH DESCRIBED TECHNIQUE)

APPARATUS AND METHOD FOR PROVIDING DECODED INSTRUCTIONS FROM A DECODED INSTRUCTION CACHE

This application claims priority to GB Patent Application No. 1816244.6 filed 5 Oct. 2018, the entire contents of which is hereby incorporated by reference.

BACKGROUND

The present technique relates to an apparatus and method for decoding instructions.

In order to seek to improve performance within a data processing system, the number of execution units able to execute instructions may be increased. For example, if N execution units are provided, then it may be possible to execute N instructions per clock cycle. However, to enable the full performance benefits to be realised, it is necessary to be able to decode instructions fetched from memory quickly enough to seek to ensure that decoded instructions are always available for execution by the execution units. However, due to power, performance and area (PPA) factors, it is often difficult to increase the number of instruction decoders so as to match the number of execution units.

To seek to alleviate this issue, a decoded instruction cache may be provided, so that once instructions have been fetched and decoded once, those decoded instructions can be cached, so that if they are required again they can be provided to the required execution unit without needing to be re-decoded.

Typically, the fetch circuitry used to fetch instructions from memory operates on fetch granules, where each fetch granule comprises multiple instructions. In particular, at each fetch cycle, a block of instructions from within a particular fetch granule can be fetched and forwarded to the decoder. Exactly which instructions from a particular fetch granule are fetched at any particular point in time will be dependent on the instruction flow through the computer program, and due to branch operations, it is possible that different parts of a given fetch granule containing different instructions are executed with no time locality.

The allocation into the decoded instruction cache is performed based on the instructions that are decoded by the decode circuitry. Hence, if only a subset of the instructions within a particular fetch granule are fetched at a particular point in time, with the corresponding decoded instructions then being allocated into a cache line of the decoded instruction cache, if in due course a different block of instructions from the same fetch granule is to be executed, a hit will not be detected within the decoded instruction cache, and accordingly those instructions will be fetched and decoded. At that point, those newly decoded instructions will be allocated into another cache line.

It would be desirable to improve efficiency in the utilisation of a decoded instruction cache.

SUMMARY

In one example arrangement, there is provided an apparatus comprising: fetch circuitry to fetch instructions from memory, where each instruction is from a fetch granule comprising P instructions at sequential addresses in the memory; decode circuitry to decode fetched instructions in order to produce a stream of decoded instructions for execution by execution circuitry; a decoded instruction cache to store decoded instructions produced by the decode circuitry, the decoded instruction cache comprising a plurality of cache blocks, where each cache block is arranged to store decoded instructions from at least one fetch granule allocated to that cache block, for each fetch granule allocated to the cache block the cache block being able to store up to P decoded instructions from that fetch granule, wherein when the corresponding decoded instruction for a required instruction for execution by the execution circuitry is already stored in the decoded instruction cache, the corresponding decoded instruction from the decoded instruction cache is output in the stream of decoded instructions; and allocation circuitry to allocate cache blocks for storing the decoded instructions, the allocation circuitry being arranged, when a cache block is already allocated for a number of existing decoded instructions from a particular fetch granule due to a first path through the fetch granule being taken, and then a number of additional decoded instructions from that particular fetch granule are subsequently produced by the decode circuitry due to a second path different to the first path being taken through the fetch granule, to update the already allocated cache block to provide both the existing decoded instructions and the additional decoded instructions.

In another example arrangement, there is provided a method of decoding instructions comprising: fetching instructions from memory, where each instruction is from a fetch granule comprising P instructions at sequential addresses in the memory; employing decode circuitry to decode fetched instructions in order to produce a stream of decoded instructions for execution by execution circuitry; storing within a decoded instruction cache decoded instructions produced by the decode circuitry, the decoded instruction cache comprising a plurality of cache blocks, where each cache block is arranged to store decoded instructions from at least one fetch granule allocated to that cache block, for each fetch granule allocated to the cache block the cache block being able to store up to P decoded instructions from that fetch granule; when the corresponding decoded instruction for a required instruction for execution by the execution circuitry is already stored in the decoded instruction cache, outputting the corresponding decoded instruction from the decoded instruction cache in the stream of decoded instructions; performing an allocation operation to allocate cache blocks for storing the decoded instructions; and when a cache block is already allocated for a number of existing decoded instructions from a particular fetch granule due a first path through the fetch granule being taken, and then a number of additional decoded instructions from that particular fetch granule are subsequently produced by the decode circuitry due to a second path different to the first path being taken through the fetch granule, the allocation operation comprises updating the already allocated cache block to provide both the existing decoded instructions and the additional decoded instructions.

In a still further example arrangement, there is provided an apparatus comprising: fetch means for fetching instructions from memory, where each instruction is from a fetch granule comprising P instructions at sequential addresses in the memory; decode means for decoding fetched instructions in order to produce a stream of decoded instructions for execution by execution means; decoded instruction cache means for storing decoded instructions produced by the decode means, the decoded instruction cache means comprising a plurality of cache blocks, where each cache block is arranged to store decoded instructions from at least one fetch granule allocated to that cache block, for each fetch granule allocated to the cache block the cache block being able to store up to P decoded instructions from that fetch granule, wherein when the corresponding decoded instruction for a required instruction for execution by the execution means is already stored in the decoded instruction cache means, the corresponding decoded instruction from the decoded instruction cache means is output in the stream of decoded instructions; and allocation means for allocating cache blocks for storing the decoded instructions, the allocation means being arranged, when a cache block is already allocated for a number of existing decoded instructions from a particular fetch granule due a first path through the fetch granule being taken, and then a number of additional decoded instructions from that particular fetch granule are subsequently produced by the decode means due to a second path different to the first path being taken through the fetch granule, to update the already allocated cache block to provide both the existing decoded instructions and the additional decoded instructions.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
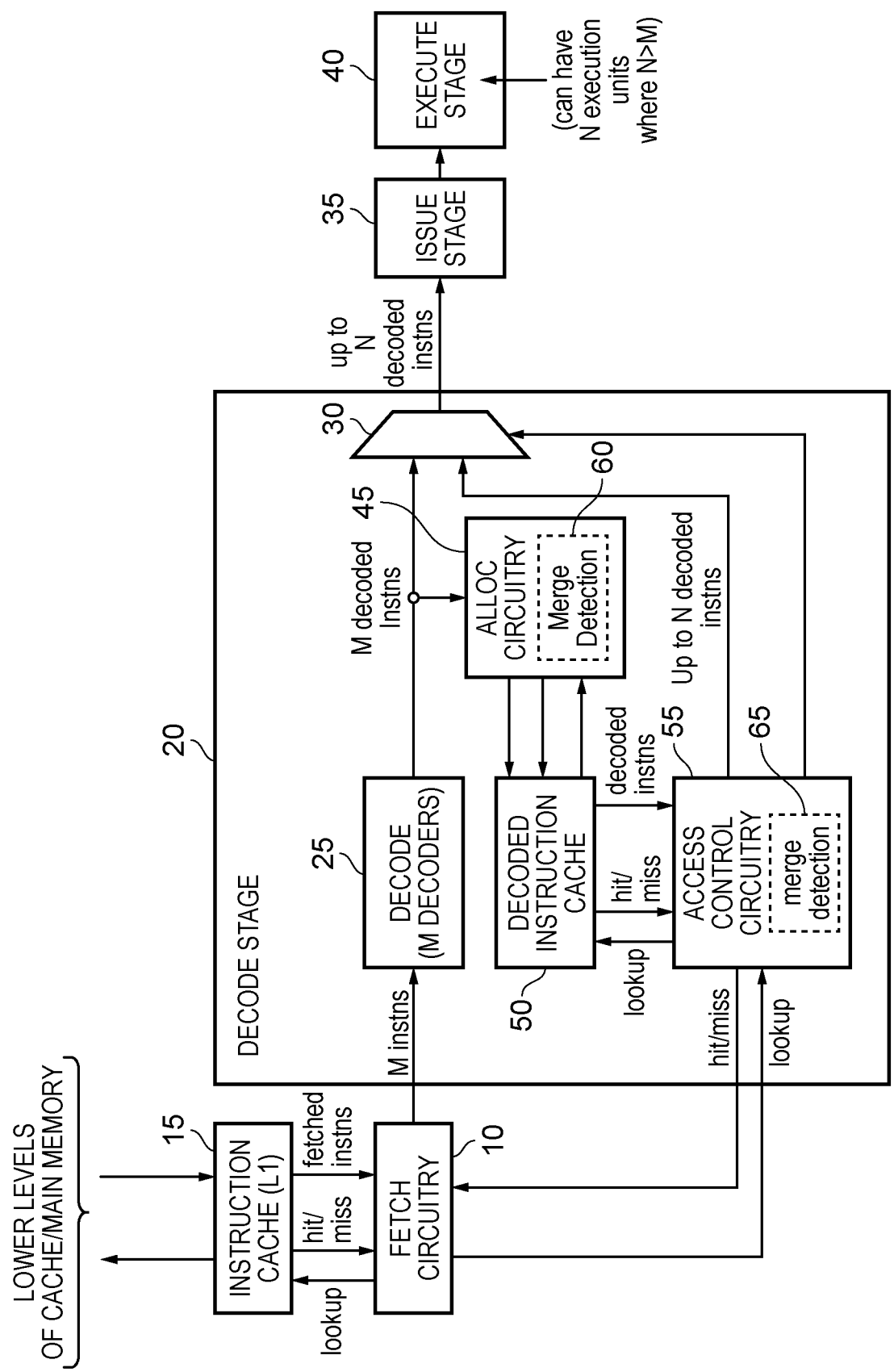
FIG. 1 is a block diagram of an apparatus in accordance with one example arrangement.

In accordance with one example arrangement, an apparatus is provided that has fetch circuitry for fetching instructions from memory, where each instruction is from a fetch granule comprising P instructions at sequential addresses in the memory. Decode circuitry is then used to decode fetched instructions in order to produce a stream of decoded instructions for execution by execution circuitry of the apparatus.

A decoded instruction cache is used to store decoded instructions produced by the decode circuitry. The decoded instruction cache has a plurality of cache blocks (each cache block typically being formed by a single cache line), where each cache block is arranged to store decoded instructions from at least one fetch granule allocated to that cache block, for each fetch granule allocated to the cache block the cache block being able to store up to P decoded instructions from that fetch granule. In one example implementation, a single fetch granule is allocated to each cache block, and the cache block is able to store up to P decoded instructions from that fetch granule. Through provision of the decoded instruction cache, when the corresponding decoded instruction for a required instruction that needs to be executed by the execution circuitry is already stored in the decoded instruction cache, there is no need to re-decode that instruction, and instead the corresponding decoded instruction from the decoded instruction cache may be output in the stream of decoded instructions.

Allocation circuitry is used to allocate cache blocks for storing the decoded instructions. When a cache block is already allocated for a number of existing decoded instructions from a particular fetch granule due to a first path through the fetch granule being taken, and then a number of additional decoded instructions from that particular fetch granule are subsequently produced by the decode circuitry due to a second path different to the first path being taken through the fetch granule (as mentioned earlier the different paths through a fetch granule can arise due to execution of branch instructions), the allocation circuitry is arranged to update the already allocated cache block to provide both the existing decoded instructions and the additional decoded instructions.

Accordingly, using the technique described herein, a merge condition can be detected when decoded instructions are produced for a fetch granule in a situation where other instructions from that fetch granule have already been decoded and allocated into a cache block of the decoded instruction cache. In that instance, instead of allocating a separate cache block for the newly decoded instructions, a merge operation can be performed in order to incorporate the newly decoded instructions into the existing allocated cache block for the fetch granule. This can give rise to significant benefits by reducing cache storage wastage that could otherwise arise through the allocation of multiple cache blocks to store different blocks of decoded instructions from the same fetch granule. It can also avoid the same decoded instruction being stored in multiple cache blocks within the decoded instruction cache (for example where such an instruction is present in both of the earlier-mentioned differing paths through the same fetch granule).

The fetch circuitry can be arranged in a variety of ways. However, in one example arrangement, the fetch circuitry is arranged when the corresponding decoded instruction for the required instruction is already stored in the decoded instruction cache, to inhibit forwarding that required instruction to the decode circuitry. Hence, the fetch circuitry effectively causes the decode circuitry to be bypassed for the instruction in question, since the corresponding decoded instruction can be provided directly from the decoded instruction cache. In one particular example arrangement, in such instances the fetch circuitry does not re-fetch the required instruction from memory, since it knows that that instruction does not need to be re-decoded, given that the corresponding decoded instruction is already present within the decoded instruction cache.

In one example arrangement, the apparatus further comprises detection circuitry arranged, for one or more decoded instructions from a fetch granule that are to be allocated into the decoded instruction cache, to detect when a cache block is already allocated for decoded instructions from that fetch granule. In particular, the detection circuitry can be arranged to perform a lookup within the decoded instruction cache in order to seek to detect such a situation.

The detection circuitry can be provided at a number of different places within the apparatus. For example, in one example arrangement, access control circuitry will be arranged to perform a lookup operation to determine whether the corresponding decoded instruction for the required instruction is already stored in the decoded instruction cache, and as discussed earlier this information may be used by the fetch circuitry to decide whether the required instruction needs fetching and passing to the decode circuitry for decoding. The detection circuitry can in one example arrangement be provided by the access control circuitry, and is arranged during the lookup operation performed by the access control circuitry to detect a merge condition when a cache block has already been allocated for decoded instructions from the fetch granule of the required instruction but that allocated cache block omits the corresponding decoded instruction for the required instruction, i.e. only part of the fetch granule has been decoded, and that part does not include the currently required instruction. In that instance, the detection circuitry may be arranged to notify the allocation circuitry when the merge condition is detected, and the allocation circuitry may then be arranged in the presence of the merge condition to update the allocated cache block to provide both the existing decoded instructions and the additional decoded instructions in due course, once the additional decoded instructions have been produced by the decode circuitry.

Hence, in accordance with the above example, the merge detection occurs up front at the time the initial lookup is performed by the access control circuitry.

However, in an alternative implementation, the detection circuitry may be provided by the allocation circuitry, and may be arranged to perform a lookup operation within the decoded instruction cache after the additional decoded instructions have been produced. In particular, the lookup operation performed by the detection circuitry within the decoded instruction cache can be used to detect the merge condition, with the allocation circuitry then being arranged in the presence of the merge condition to update the allocated cache block to provide both the existing decoded instructions and the additional decoded instructions. Hence, in this implementation, the detection of the merge condition occurs at the time of allocation.

The allocation circuitry can be arranged in a variety of ways. However, in one example the allocation circuitry comprises adjustment circuitry arranged, when the allocated cache block is to be updated to provide both the existing decoded instructions and the additional decoded instructions, to discard from the additional decoded instructions any decoded instruction also provided by the existing decoded instructions and to then shift the remaining additional decoded instructions so as to align them with associated available locations within the allocated cache block. The allocation circuitry may then be arranged to be responsive to the adjustment circuitry to perform a merge operation to populate the associated available locations with the remaining additional decoded instructions whilst retaining the existing decoded instructions within the allocated cache block.

Hence, by such a process, any duplication in decoded instructions can be detected, with those duplicate decoded instructions then being discarded prior to the merge operation being performed. Further, the remaining additional decoded instructions that are to be added to the allocated cache block can be aligned with the appropriate empty locations within the cache block, whereafter a merge operation can be used to merge the remaining additional decoded instructions with the existing cache block contents.

In one example arrangement, the existing decoded instructions occupy a first series of locations within the allocated cache block, and the associated available locations are a second series of locations non-overlapping with the first series of locations. Whilst the relationship between the first series of locations and the second series of locations may vary dependent on implementation, in one example implementation a first location of the second series is adjacent to a final location of the first series. Hence, the second series of locations can be arranged to be a consecutive series immediately following the final location of the first series.

The allocation mechanism may take a variety of forms but in one implementation, when a cache block is initially allocated for a number of decoded instructions from the same fetch granule, those decoded instructions are located in consecutive locations of the cache block starting from an initial location. Hence, no empty locations are left between decoded instructions allocated into the cache block.

In one example implementation, the updating of the already allocated cache block by the allocation circuitry to provide both the existing decoded instructions and a number of additional decoded instructions can be performed whenever one or more additional decoded instructions are produced that relate to an already allocated cache block. However, if desired, such an update can be restricted such that the allocation circuitry is arranged to update the allocated cache block to provide both the existing decoded instructions and the additional decoded instructions when the remaining additional decoded instructions are sufficient to populate all locations within the allocated cache block unoccupied by the existing decoded instructions. In particular, this enables situations to be identified where the originally unoccupied space within an existing cache block can be fully exploited.

The decoded instruction cache can take a variety of forms. For example, it could be a fully associative cache structure, but in one example arrangement the decoded instruction cache is an X-way set associative cache, where each set comprises one cache block in each of the X ways, and each set is associated with multiple fetch granules such that decoded instructions from any of those multiple fetch granules are allocated to one of the cache blocks in the associated set. Any given fetch granule may be associated with a specific set, since in one implementation the cache will be indexed using the address bits that are common to a particular fetch granule. Hence, in that instance any given fetch granule will only be mapped to a particular set, but then could be allocated into any cache block within that set.

The first path and the second path through the fetch granule can take a variety of forms, provided that at least one instruction differs between the first path and the second path. For example, in one arrangement, the first path and the second path are exclusive paths, such that the instructions in the first path are non-overlapping with the instructions in the second path. Hence, in this case, there are no common instructions between the first path and the second path. However, in an alternative arrangement, the first path and the second path may be partially exclusive paths, such that a subset of the instructions in the first path is non-overlapping with a subset of the instructions in the second path. Hence, in this latter case, there will be some common instructions between the first path and the second path, but one or more of the instructions in the first path will be different to one or more instructions in the second path.

In one example arrangement, the decoder circuitry comprises M decoders, and the execution circuitry comprises N execution units, where N>M. Hence, it is possible to provide N instructions per cycle to the execute units, even though there are less than N decoders within the system, through the use of the decoded instruction cache. Due to the techniques described herein, the effective size of the decoded instruction cache can be increased, due to the more efficient utilisation of the space within the decoded instruction cache.

In one example arrangement, the fetch unit is arranged to fetch instructions in blocks, and to pass those blocks of instructions to the decode circuitry for decoding, each block comprising between 1 and P instructions from the same fetch granule. Further, the instructions fetched may be dependent on the instruction flow through a computer program, the instruction flow being such that different paths are taken through at least one fetch granule that is encountered multiple times during the instruction flow.

In some implementations, a partial hit within the decoded instruction cache may be utilised to avoid the need to decode at least some of the instructions within a block of instructions that the fetch circuitry is about to fetch. In that instance, only the instructions within the block that are not already in the decoded instruction cache need to be fetched and passed to the decoder circuitry, with the remaining instructions then being provided in their decoded form directly from the decoded instruction cache.

However, in an alternative implementation, it may be decided that a hit within the decoded instruction cache only occurs when all of the instructions required for a particular block in question are already present within the decoded instruction cache. Hence, in accordance with this latter arrangement, the fetch circuitry is arranged, when for a block of required instructions from the same fetch granule the corresponding decoded instructions are already stored in the decoded instruction cache, to cause the decode circuitry to be bypassed for the block of required instructions and to instead cause the corresponding decoded instructions from the decoded instruction cache to be output in the stream of decoded instructions. However, otherwise the block of required instructions will be fetched and decoded by the decode circuitry, and the above described merge process may be then be used to increase the utilisation of the allocated cache block.

Particular examples will now be described with reference to the Figures.

Figure 2:
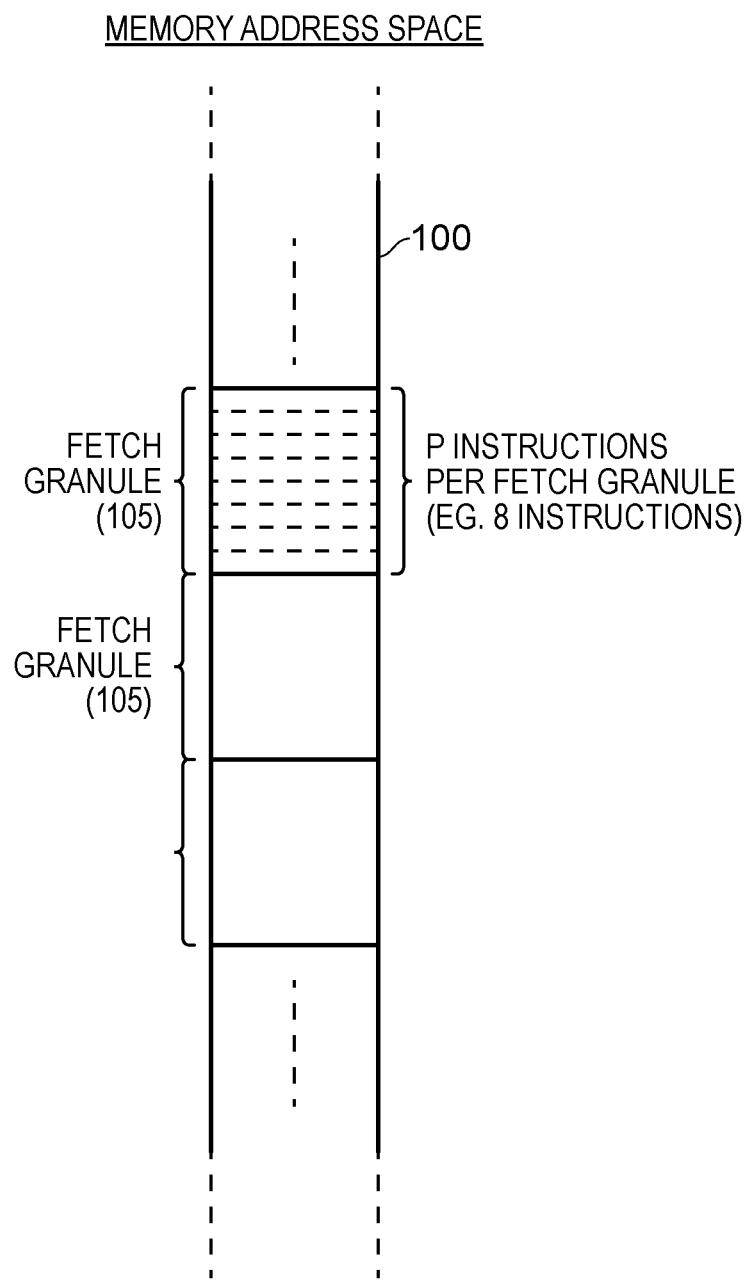
FIG. 2 illustrates how fetch granules may be provided within the memory address space.

FIG. 1 is a block diagram of an apparatus in accordance with one example arrangement. Fetch circuitry 10 is provided for fetching instructions from memory for execution by the execute stage 40 of the apparatus. The fetch circuitry 10 will typically interface with main memory via one or more levels of cache, including the level 1 instruction cache 15 shown in FIG. 1. The fetch circuitry is arranged to operate on fetch granules, where each fetch granule comprises P instructions, as illustrated schematically in FIG. 2. In particular, FIG. 2 shows the memory address space 100, and indicates how the instructions appearing at sequential addresses in memory are grouped into fetch granules 105. The value of P can vary dependent on implementation, but in one illustrative example will be considered to be 8, and thus there will be eight instructions per fetch granule.

It should be noted that a fetch granule will not typically be allowed to start anywhere in memory, but instead will be aligned based on its own size. Hence, the fetch granules illustrated in FIG. 2 will be eight instructions aligned. Thus a fetch granule memory range can be expressed as the portion of a virtual address from the most significant bit down to bit 5 in addresses 0xi to 0xi+7.

In any particular fetch cycle, the fetch circuitry will issue a lookup request to the instruction cache 15 specifying a block of instructions to be fetched with reference to a specified address, where the block will comprise between one and P instructions from the same fetch granule. Whilst a particular fetch request may seek to retrieve all of the P instructions within a fetch granule, this will not always be the case, as the instructions to be fetched will depend on the instruction flow through the computer program. In particular, the computer program will typically include branch instructions that cause discontinuous changes in instruction flow. The fetch circuitry can be coupled to branch prediction circuitry which seeks to make predictions as to whether branch instructions will be taken or not, with the fetch circuitry using those predictions to determine the instructions to be fetched. Hence, purely by way of example, if the branch prediction circuitry predicts that the fourth instruction in a particular fetch granule will be a branch instruction that is predicted as taken, the fetch circuitry may only seek to fetch the first four instructions from the fetch granule.

When a fetch request is issued from the fetch circuitry to the instruction cache 15 (also referred to herein as a lookup request to the instruction cache), a lookup operation will be performed in the instruction cache to determine whether the required instructions for the block currently being requested by the fetch circuitry are present within the instruction cache. If so, then a hit will be considered to have occurred, and the fetched instructions will be returned from the instruction cache to the fetch circuitry. In the event of a miss, then the instructions will be retrieved from lower levels of cache or main memory, and in due course will be returned via the level 1 instruction cache 15 to the fetch circuitry 10.

Once instructions have been fetched from memory, they are routed to the decode circuitry 25 within the decode stage 20 of the apparatus. In the illustrated example, the decode circuitry 25 has M decoders, and hence can decode M instructions per decode cycle. This results in the generation of up to M decoded instructions per decode cycle, which are then routed via the multiplexer 30 to the issue stage circuitry 35. As will be understood by those skilled in the art, the instructions can then be dispatched from the issue stage 35 to the execute stage 40 for execution by the execute stage. The execute stage 40 may include a plurality of execution units, and in one particular example may include N execution units, where N is greater than M.

In such an arrangement, it will be appreciated that the number of decoders within the decode circuitry 25 is less than the number of execute units within the execute stage 40, and hence there is a potential that the decoding operations may not be able to keep up with the demand for new executions from the execution stage. However, in order to boost the effective performance of the decode stage, a decoded instruction cache 50 may be provided which can also be used as a source of decoded instructions for issuing to the issue stage 35. In particular, when the instructions are first decoded, then in addition to being routed to the issue stage 35 via the multiplexer 30, those decoded instructions are also forwarded to the allocation circuitry 45 for allocation into the decoded instruction cache 50. In particular, the allocation circuitry will identify an available cache line (also referred to herein as a cache block) within the decoded instruction cache 50, and will then allocate the decoded instructions to that cache line.

When the fetch circuitry is determining a new block of instructions that it desires to provide to the issue stage via the decode stage, it not only issues a lookup request to the instruction cache 15, but also issues a lookup request to the access control circuitry 55 used to control access into the decoded instruction cache 50. Hence, a lookup can be performed in parallel within the instruction cache 15, and within the decoded instruction cache 50, with the results of those lookup procedures being returned to the fetch circuitry.

If the block of instructions required are determined to already be present within the decoded instruction cache, then those instructions do not need to be fetched from the instruction cache 15, and instead can be routed directly from the decoded instruction cache 50, via the access control circuitry 55 to the multiplexer 30 for forwarding on to the issue stage 35. The access control circuitry 55 can be used to control the multiplexer 30, so that by default it is the output from the decoder circuitry 25 that is routed to the issue stage 35, but that when decoded instructions retrieved from the instruction cache 50 are instead to be forwarded, the multiplexer can be controlled so that those already decoded instructions are routed to the issue stage 35 rather than the output from the decode circuitry 25.

Through the provision of the decoded instruction cache 50, this enables the number of decoded instructions that can be output from the decode stage in each decode cycle to exceed the number of individual decode units provided within the decode circuitry 25. The solution hence provides higher performance, but also allows power consumption savings, by avoiding re-decoding instructions that have previously been decoded, provided those decoded instructions are still resident within the decoded instruction cache 50.

The decoded instruction cache can be organised in a variety of ways, but in one example is an X-way set associative cache. Any suitable victim selection policy can be used to identify victim cache lines whose contents are to be discarded in order to free up cache lines for allocation of newly decoded instructions, and purely by way of example a least recently used policy may be used for this purpose.

In one example implementation, the size of the cache lines within the decoded instruction cache 50 can be chosen so as to correlate with the size of a fetch granule, so that all of the instructions for a particular fetch granule can be decoded and then allocated into a cache line of the decoded instruction cache 50. This works well when the entire fetch granule is fetched and decoded at one point in time. However, as discussed earlier, branch instructions can be included within the fetch granules, and these can cause changes in instruction flow that result in different parts of a fetch granule being executed at different points in time. In particular, this may result in multiple different paths being taken through a fetch granule over time. Since the allocation circuitry operates on the output from the decode circuitry 25, then each time the decode circuitry 25 produces any block of decoded instructions, the allocation circuitry seeks to allocate those decoded instructions into a cache line. This can lead to inefficient utilisation of the available space within the decoded instruction cache 50. For example, if the number of instructions decoded is less than P, then there will be some unused space in the allocated cache line for the corresponding decoded instructions. Further, when at different points in time different subsets of instructions within a fetch granule are fetched and decoded, each block of decoded instructions will be allocated into a separate cache line.

In order to seek to improve the efficiency of utilisation of the available space within the decoded instruction cache 50, merge detection circuitry 60 or 65 is provided within the decode stage. The purpose of the merge detection circuitry is to detect situations where the decoded instructions produced by the decode circuitry 25 relate to part of a fetch granule, and the decoded instruction cache 50 already includes an allocated cache line for another part of the same fetch granule. As mentioned earlier, such a scenario can arise due to a first path being taken through the fetch granule at a first point in time, resulting in an initial allocation into the decoded instruction cache, and then a second path different to the first path being taken through the fetch granule at a later point in time, which results in other instructions from the fetch granule being fetched and decoded, and hence the production of further decoded instructions for allocation by the allocation circuitry 45.

In the presence of the merge condition being detected, the allocation circuitry is arranged to store the newly decoded instructions into unused space within the already allocated cache line, so that a single cache line is used to store the decoded instructions from both the first path and the second path, rather than two separate cache lines. This can significantly improve the effective capacity of the decoded instruction cache by reducing wasted space. As a result, this can result in an overall improvement in performance, since more decoded instructions can be stored within the decoded instruction cache. Accordingly there is an increased likelihood of a hit being found in the decoded instruction cache, and hence for decoded instructions to be provided via the decoded instruction cache rather than having to be decoded by the decode circuitry 25.

In one implementation, the merge detection circuitry 60 is provided as part of the allocation circuitry 45, so that once the decoded instructions have been output by the decode circuitry 25 a lookup operation within the decoded instruction cache 50 can be performed using the merge detection circuitry 60 in order to detect a merge condition when a cache line has already been allocated for decoded instructions from the same fetch granule, with the allocation circuitry then seeking to merge the newly decoded instructions into the existing cache line contents.

However, in an alternative implementation the merge detection circuitry 65 may be provided as part of the access control circuitry 55 that is used to process lookup requests from the fetch circuitry 10. Hence, at the time the initial lookup is performed in the decoded instruction cache 50 based on the lookup request from the fetch circuitry, then in a situation where the currently required instructions are not all provided within the decoded instruction cache, and accordingly instructions do need to be fetched and decoded by the decode stage 25, the merge detection circuitry 65 can still detect whether there is a cache line already allocated for some of the decoded instructions for the same fetch granule, and in that instance can flag the merge condition to the allocation circuitry 45 so that in due course a merge operation can be performed by the allocation circuitry when the newly decoded instructions are output by the decode circuitry 25.

Figure 3:
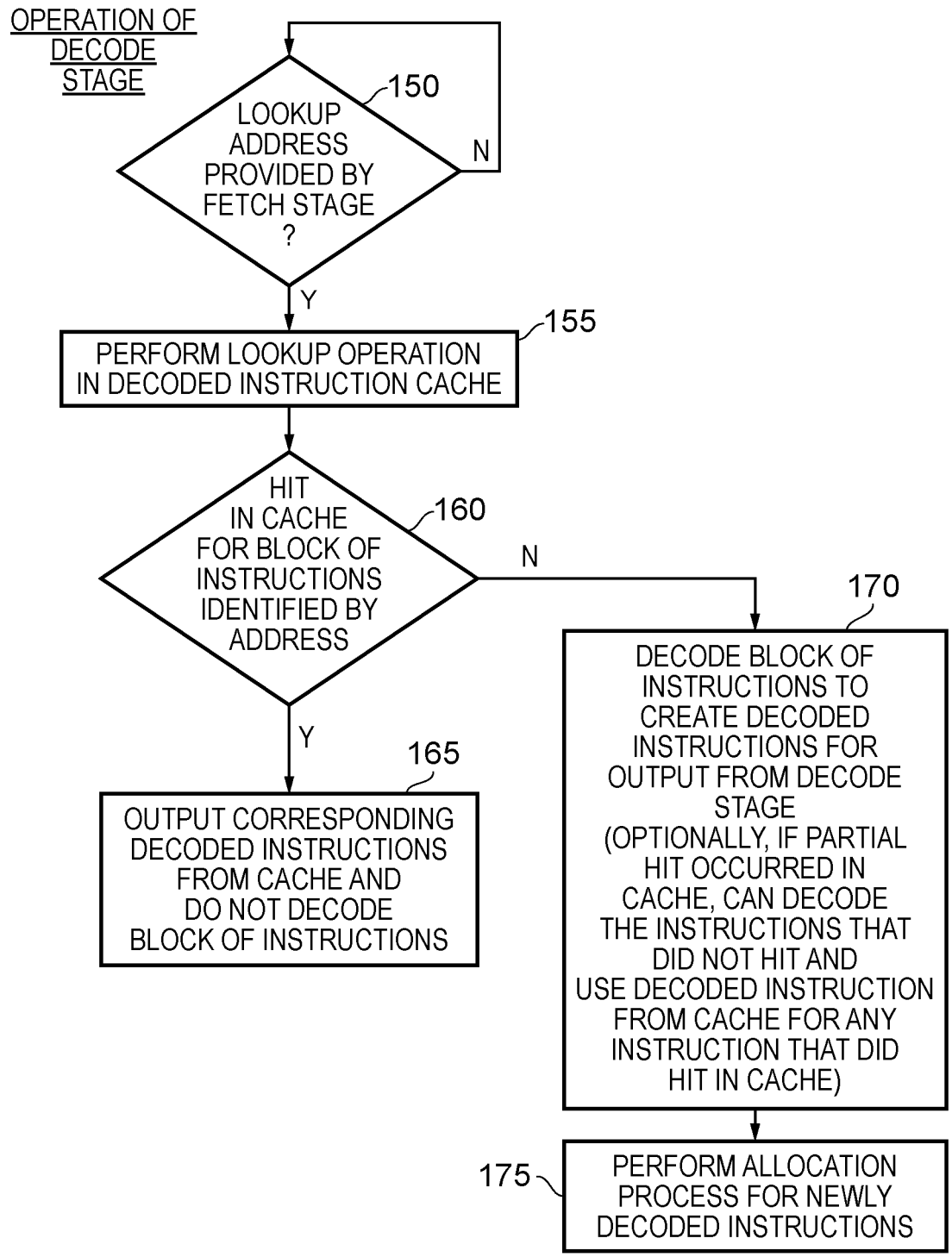
FIG. 3 is a flow diagram illustrating the operation of the decode stage of FIG. 1 in accordance with one example arrangement.

FIG. 3 is a flow diagram illustrating the operation of the decode stage 20 of FIG. 1 in one example implementation. At step 150, the access control circuitry 55 awaits a lookup address provided by the fetch stage 10. Upon receiving a lookup request specifying address information for a block of instructions that are currently required, the access control circuitry 55 performs a lookup operation in the decoded instruction cache 50 at step 155, and then determines at step 160 whether a hit is detected in the decoded instruction cache for the block of instructions identified by the address information provided with the lookup request. In one example implementation, a hit will only be detected if all of the instructions within the block currently reside within the decoded instruction cache.

In the event that such a hit is detected at step 160, then a hit signal is returned to the fetch circuitry to inform the fetch circuitry that it does not need to fetch any of the instructions for the required block, and that instead the corresponding decoded instructions will be output at step 165 from the decoded instruction cache 50 and routed via the multiplexer 30 to the issue stage 35. Hence, in that instance, none of the required instructions for a current block identified by the fetch circuitry do in fact need to be fetched from memory and decoded.

In the event that a hit is not detected at step 160, then a miss signal will be returned to the fetch circuitry 10, causing the fetch circuitry to fetch the instructions for the required block via the instruction cache 15, and to route those instructions to the decode circuitry 25, where at step 170 those block of instructions will be decoded in order to create decoded instructions for output from the decode stage 20. Thereafter, at step 175, the allocation circuitry 45 will perform an allocation process for the newly decoded instructions. As discussed earlier, if a merge condition has been detected by the merge detection circuitry 60, 65, then the newly decoded instructions will be allocated into an existing cache line that already stores a subset of the decoded instructions from the same fetch granule, as will be discussed in more detail later.

As indicated at step 170, in one example implementation a partial hit mode may be supported. In particular, it can sometimes be the case that the differing paths through a particular fetch granule can have some overlap, and accordingly when considering a particular block of instructions that is now required from a fetch granule, it may be the case that some, but not all, of those instructions have been previously decoded, and are currently allocated into a cache line of the decoded instruction cache. In that instance, a partial hit may be indicated at step 160. Since this means that at least one or more instructions of the required block still need to be fetched and decoded, then the path still proceeds to step 170 of FIG. 3, but in this instance it is only those instructions within the required block that are not yet stored in the decoded instruction cache which are decoded by the decode circuitry 25 at step 170. The other instructions that did result in a hit in the decoded instruction cache are instead routed directly from the decoded instruction cache 50. At step 175, the allocation circuitry will still seek to merge the newly decoded instructions with the existing allocated cache line contents for the same fetch granule.

Figure 4:
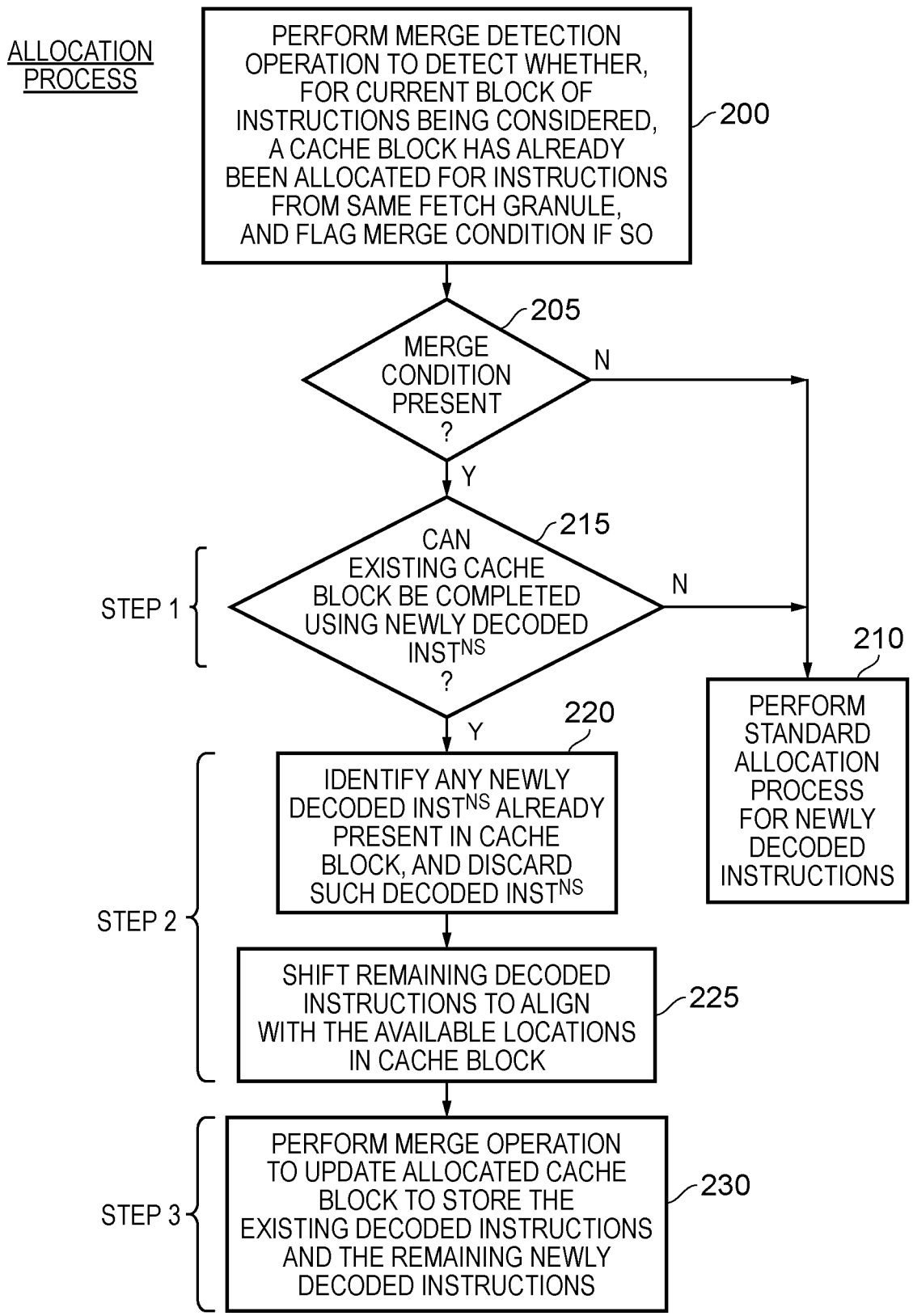
FIG. 4 is a flow diagram illustrating the allocation process employed in one example arrangement in order to allocate decoded instructions into the decoded instruction cache.

FIG. 4 is a flow diagram illustrating the allocation process used to allocate decoded instructions into the decoded instruction cache 50, in accordance with one example arrangement. At step 200, a merge detection operation is performed by the merge detection circuitry 60, 65 in order to detect whether, for a current block of instructions being considered, a cache line (cache block) has already been allocated for instructions from the same fetch granule, but where not all of the block of instructions currently being considered have their equivalent decoded instruction within that cache line. As mentioned earlier, this merge detection operation can be performed upfront by the merge detection circuitry 65 at the time the initial lookup request from the fetch circuitry 10 is processed, with the merge condition being flagged for later use by the allocation circuitry 45 when the decoded instructions are subsequently produced, or instead this merge detection operation may be performed by the merge detection circuitry 60 once the decoded instructions have been output by the decode circuitry 25.

At step 205, it is determined whether the merge condition has been detected as present, and if not the process proceeds to step 210 where a standard allocation process is performed for the newly decoded instructions. In particular, standard victim selection policies may be used to determine a cache line into which those decoded instructions are to be allocated, and those newly decoded instructions will become the only contents of that newly allocated cache line at that point in time.

However, if the merge condition is detected as being present at step 205, then in one example implementation the process proceeds to step 215 where it is determined whether the existing allocated cache line can be completed using the newly decoded instructions. In particular, in one example implementation the merging process is only used in situations where the newly decoded instructions will allow the cache line to be fully utilised. Hence, assuming a cache line can store P decoded instructions, it is determined at step 215 whether the addition of the newly decoded instructions to the cache line will result in there being P decoded instructions residing within the cache line. If not, then the process proceeds to step 210 where the standard allocation process is performed, and in particular a separate cache line will be allocated for the newly decoded instructions.

However, whilst the implementation of step 215 enables situations to be detected where the merging process will result in an existing cache line being fully exploited, in some implementations it may be desirable to omit step 215, and allow the merging process to be performed even if it will not result in a cache line being completely filled with decoded instructions. Hence, purely by way of example, if a currently allocated cache line for a fetch granule stores the first four instructions from that fetch granule, and the newly decoded instructions provide two additional instructions from the fetch granule, it may be determined to implement the merging process even though the resultant cache line will still have two additional free locations for storing a further two decoded instructions from the fetch granule.

If at step 215 it is determined that the existing cache line can be completed using the newly decoded instructions, or if that test is not performed, and hence the process proceeds directly from the yes path of step 205, then the process proceeds to step 220 where the allocation circuitry 45 seeks to identify any newly decoded instructions that are already present in the identified cache line, with those identified instructions being discarded from the newly decoded instructions. In particular, as discussed earlier, in one implementation a hit will be detected within the decoded instruction cache if all of the instructions required for a particular block under consideration are already present in the decoded instruction cache, and if that is not the case all of the instructions for that block will have been fetched and decoded. Where the different paths through a particular fetch granule are partially overlapping, it will be appreciated that in some instances this will mean that some of the decoded instructions produced by the decode circuitry are already allocated in the decoded instruction cache. In such situations, the decoded instructions which are already present within the cache are identified at step 220, so that they can be excluded from the contents that need to be merged with the existing cache line contents.

At step 225, the remaining decoded instructions are shifted to align them with the available locations in the cache line, and thereafter at step 230 a merge operation is performed to update the allocated cache block to store the existing decoded instructions and the remaining newly decoded instructions. As a result, it will be seen that when the merge condition is detected to be present, and provided the test of step 215 is passed in implementations that use that test, then all of the newly decoded instruction information can be accommodated within the decoded instruction cache without needing to allocate a new cache line, and instead those newly decoded instructions can be incorporated within an existing cache line already allocated for the fetch granule in question.

As mentioned earlier, the decoded instruction cache 50 can be organised in a variety of ways, and hence could in one implementation be a fully associative cache. However, in one particular example arrangement, the decoded instruction cache is arranged as a set associative cache, as illustrated schematically in FIG. 5. Hence, the decoded instruction cache consists of a TAG RAM 300 having a plurality of entries organised into multiple ways 305, 310, 315, 320. Each TAG RAM entry 355 includes an address portion referred to as a tag portion of the address, and some offset information used to identify which instructions within the fetch granule are stored in the corresponding cache line 360 of the data RAM 330. In particular, as shown, data RAM 330 is also arranged into a plurality of ways 335, 340, 345, 350, each way comprising a plurality of cache lines 360, where each cache line can store up to P decoded instructions. The corresponding entry 355 in the TAG RAM 300 provides, via the tag portion, sufficient information to identify the fetch granule to which the decoded instructions in the corresponding cache line relate. The offset information in the corresponding tag entry 355 then enables an identification of which instructions within the fetch granule are represented by the decoded instructions in the cache line.

Figure 5:
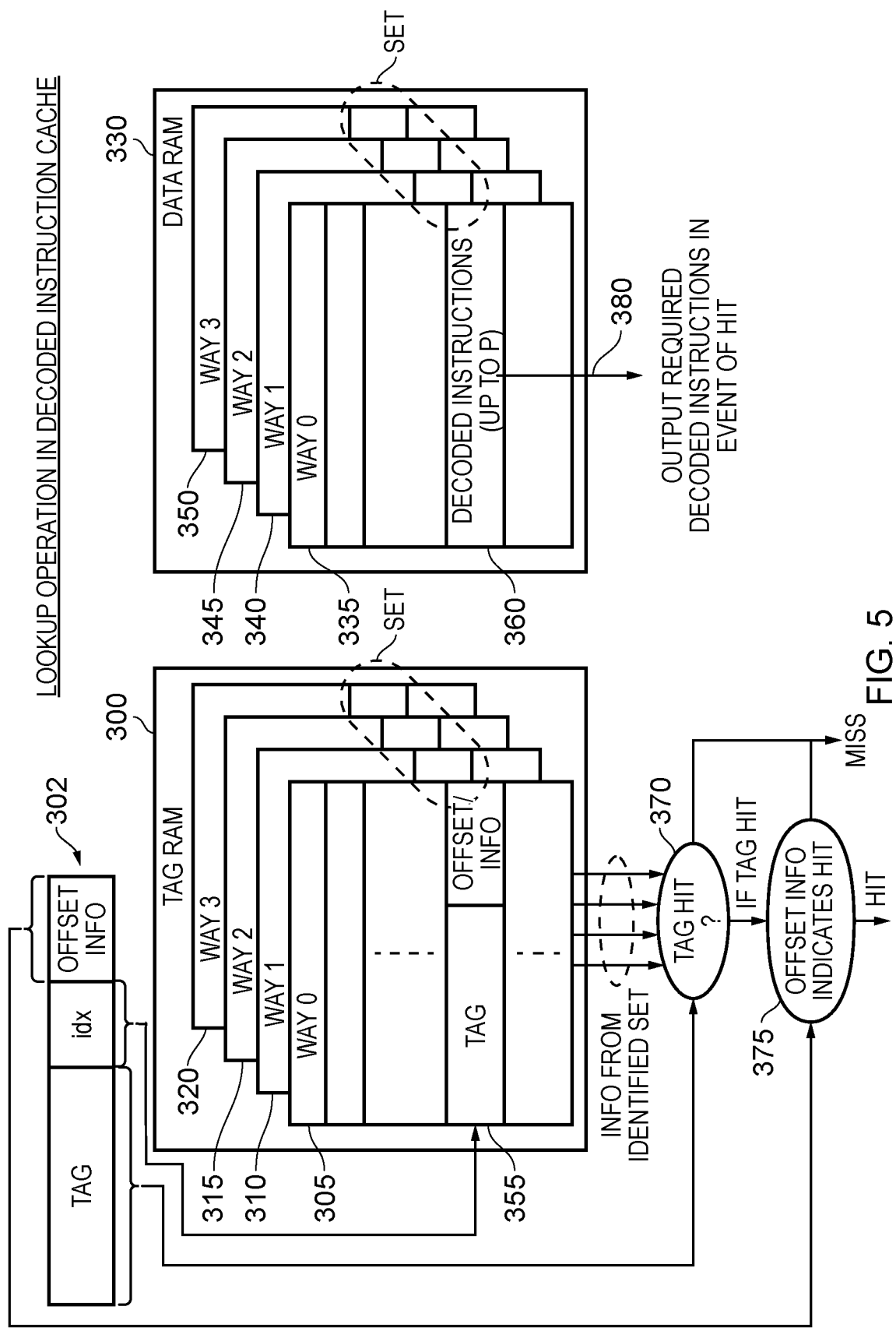
FIG. 5 is a diagram schematically illustrating the arrangement of the decoded instruction cache and the performance of a lookup operation therein, in accordance with one example arrangement.

When a fetch lookup request is issued by the fetch circuitry 10, the address information is provided in the form 302 shown in FIG. 5. In particular, an index portion of the address is used to identify a particular set within the cache, hence identifying a particular set of TAG RAM entries and a corresponding set of cache lines. The tag information in each of the entries 355 within the identified set are then output to comparison circuitry 370, which compares that tag information with the tag portion of the fetch request address 302. In the event of a hit being detected in one of the entries, this means that the decoded instruction cache currently stores one or more instructions for the fetch granule identified by the tag and index bits of the fetch address 302. However, as will be apparent from the earlier discussion, the corresponding cache line 360 may only store some of the decoded instructions for that fetch granule, and accordingly a further check is performed by comparison circuitry 375 to determine whether the offset information from the hit TAG RAM entry 355 matches with the offset information specified in the address 302. If it does, then a hit is indicated to the fetch circuitry, and the instructions for the currently required block do not need to be fetched by the fetch circuitry 10 or decoded by the decode circuitry 25, and instead the corresponding decoded instructions will be output directly over path 380 from the appropriate cache line 360. However, in the event of a miss being detected by the comparison circuitry 370, 375, then the fetch circuitry 10 will need to fetch the instructions for the current required block, and those instructions are then decoded by the decode circuitry 25.

As discussed earlier, it is possible to operate the apparatus in a partial hit mode, so that when some, but not all, of the instructions for a currently required block already reside within the decoded instruction cache, then those decoded instructions can be provided by the decoded instruction cache, and only the remaining instructions need to be fetched and decoded.

Figure 6:
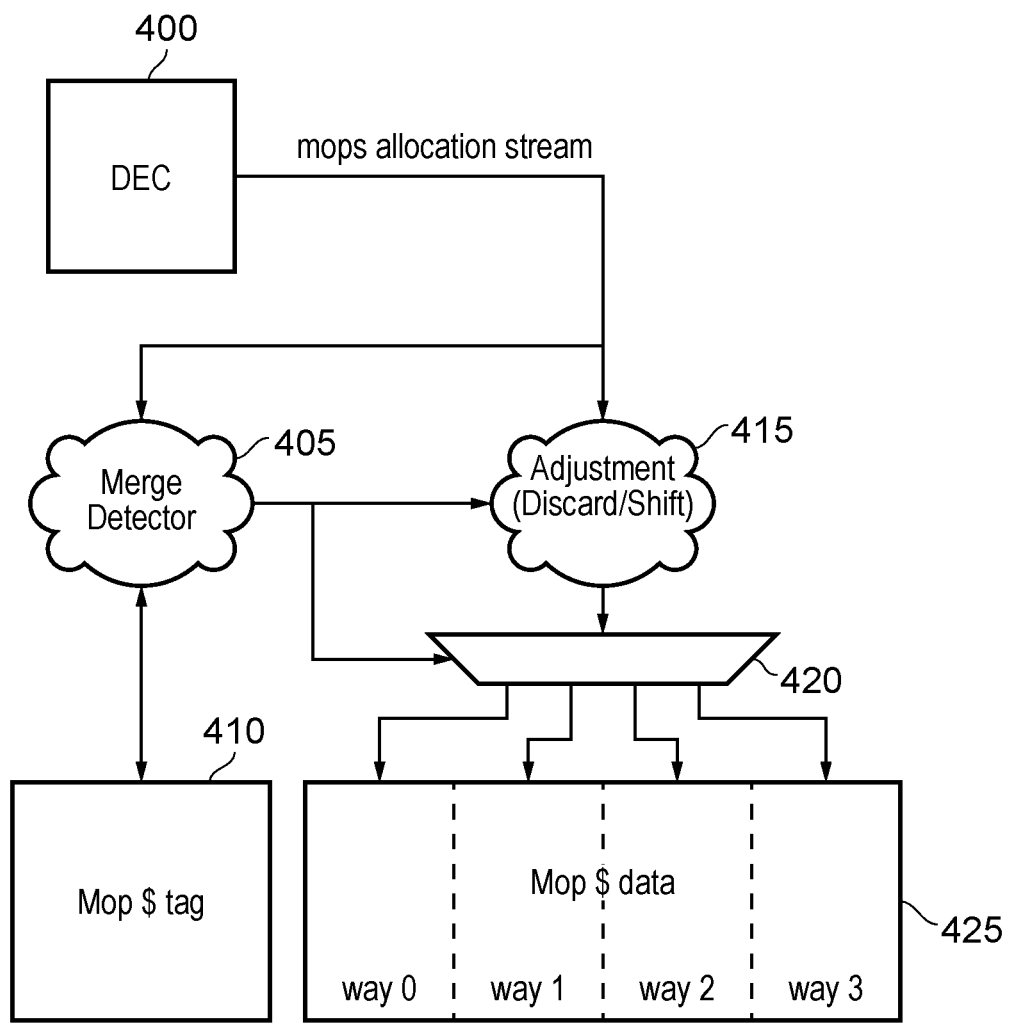
FIG. 6 is a diagram schematically illustrating the allocation process in accordance with one example arrangement.

FIG. 6 schematically illustrates the allocation process that takes place in the presence of the merge condition being detected. The decode circuitry 400 will output a stream of decoded instructions, the decoded instructions also being referred to herein as macro operations or "mops". The merge detection circuitry 60, 65 will perform a merge detection operation 405, during which a lookup will be performed within the TAG RAM 410 of the decoded instruction cache 50 (also referred to herein as the mop cache) in order to determine whether the merge condition is present.

In situations where the merge condition is detected, then the adjustment operation 415 will be performed by the allocation circuitry in order to discard any newly decoded instructions that are already present within the pre-existing allocated cache line for the fetch granule in question, and to then shift the remaining newly decoded instructions so as to align them with available locations within the existing allocated cache line. The output from the adjustment operation 415 will then be routed via the multiplexing stage 420 to the required way within the data RAM of the decoded instruction cache 425. At that point, the shifted remaining newly decoded instructions will be written into the existing cache line in the available locations that were otherwise unused.

Figure 7:
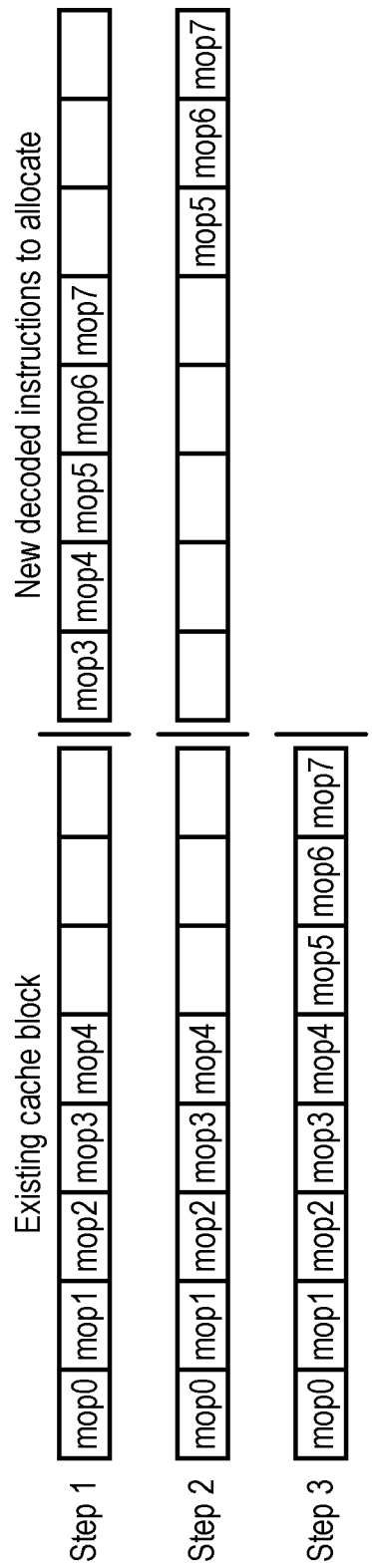
FIG. 7 schematically illustrates the use of the allocation process of FIG. 6 in the presence of a merge condition, for one specific example.

This process is illustrated by way of specific example with reference to FIG. 7. The three steps shown in FIG. 7 are also annotated in FIG. 4, and accordingly step 1 corresponds to step 215 of FIG. 4. In particular, at this stage it is assumed that an existing cache line already stores the first five decoded instructions (referred to as mop0 to mop4) of a particular fetch granule, and that the current block in question requires instructions 3 to 7 of the fetch granule to be decoded. Since the original lookup in the mop cache initiated by the fetch circuitry will not have produced a hit, then those instructions will have been fetched and passed to the decoder, resulting in the newly decoded instructions mop3 to mop7 being produced by the decode circuitry 25. When applying the test of step 215, it will be determined that the newly decoded instructions will enable the existing cache line to be completed, and accordingly step 1 is passed.

At step 2, which implements steps 220 and 225 of FIG. 4, the newly decoded instructions mop3 and mop4 will be discarded as they are already present within the existing cache line, and the remaining newly decoded instructions mop5 to mop7 will be shifted so as to align them with the final three locations within the existing cache line.

Thereafter, at step 3 (which corresponds to step 230 in FIG. 4), a merge operation will be performed in order to write the newly decoded instruction mop5 to mop7 into the final three locations of the existing allocated cache line, thereby completing the cache line contents. At this point, the offset information maintained within the corresponding TAG RAM entry 355 will be updated to identify that all of the instructions within the fetch granule are now represented by decoded instructions within the corresponding cache line. Only the offset information needs to be updated as the newly decoded instructions are added after the existing ones within the cache line.

Figure 8A:
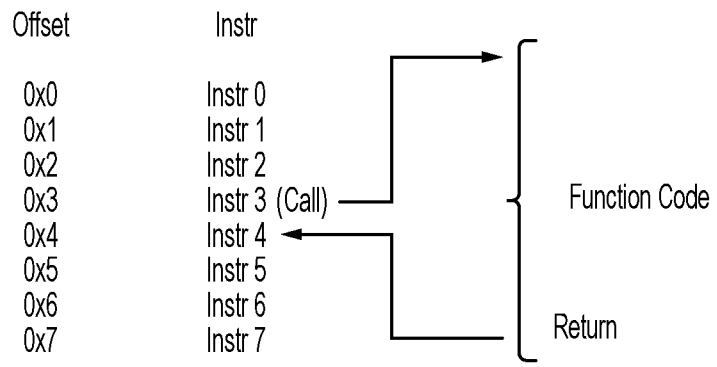
FIGS. 8A to 8C and 9A to 9C illustrate specific examples of different paths being taken through a different fetch granule, and how more efficient allocation into the decoded instruction cache can be achieved when using the merge detection techniques described herein.

As mentioned earlier, due to branch instructions within the program code, multiple different paths through a particular fetch granule may take place at different points in time. FIG. 8A gives one particular example where a fetch granule of eight instructions includes a branch instruction as instruction 3, which calls another function elsewhere in the instruction address space. In due course, after that function has been performed, a return operation will be used to return to instruction 4 within the fetch granule, whereafter the remaining instructions in the fetch granule will be executed. This hence represents an exclusive path scenario where the first and second paths through the same fetch granule are exclusive, i.e. include no instructions in common.

Figure 8B:
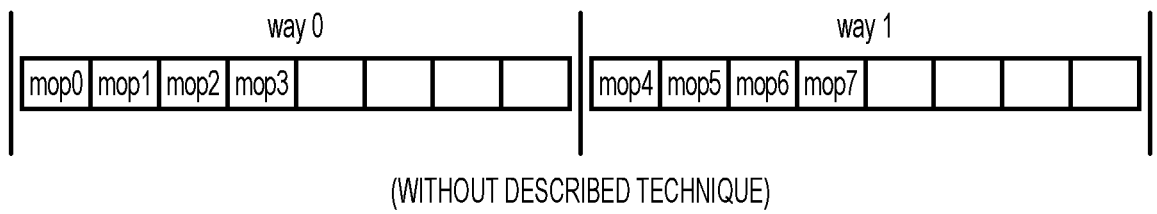

FIG. 8B illustrates how the decoded instruction cache would have been utilised in the absence of the merging process described herein. In particular, when the fetch granule was initially encountered, and instructions 0 to 3 were decoded, an allocation for the corresponding decoded instructions mop0 to mop3 would have been made into the decoded instruction cache 50. In this example, it is assumed that those decoded instructions are allocated into way 0 of the appropriate set within the decoded instruction cache. In due course, when the second path through the fetch granule is encountered, and accordingly instructions 4 to 7 are decoded, the corresponding decoded instructions mop4 to mop7 would be allocated into the cache, and it is assumed at this point that they are allocated into a different way. Hence, all of the instructions for the fetch granule have been decoded, and do still reside within the decoded instruction cache, but two of the ways within the cache are used to retain the information.

Figure 8C:
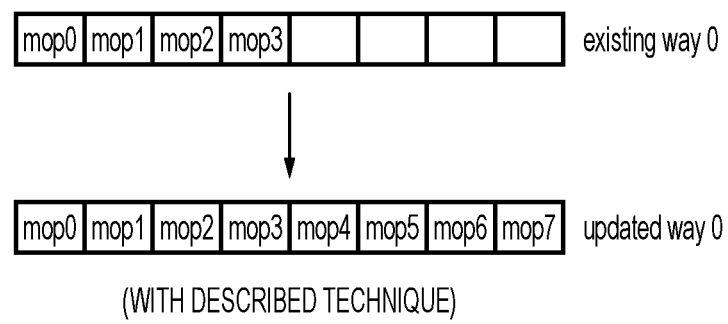

However, as illustrated in FIG. 8C, when using the merging technique discussed herein, then at the time the second path through the fetch granule takes place, the merge condition will be detected, and the newly decoded instructions will be merged into the same cache line in way 0 that is already used for the other instructions of the same fetch granule. This results in the updating of the cache line in way 0 so that it holds all of the decoded instructions for the fetch granule in question.

Figure 9A:
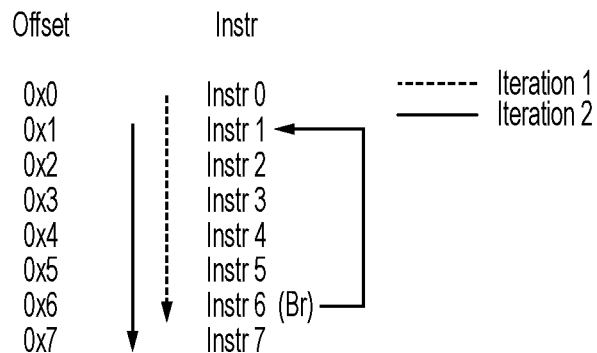
Figure 9B:
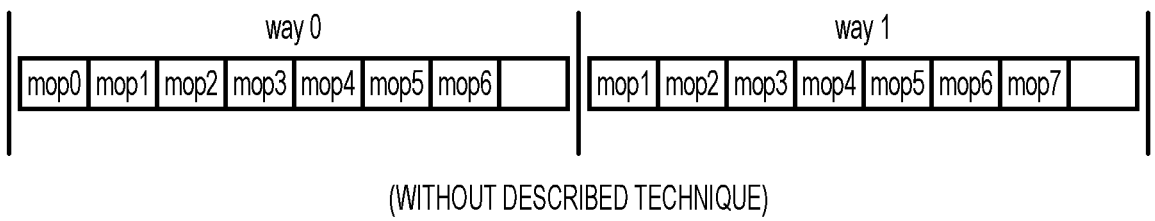
Figure 9C:
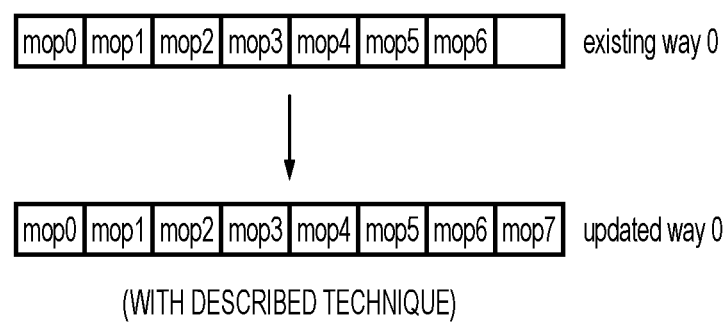

FIGS. 9A to 9C illustrate another example where the two paths through the fetch granule are partially exclusive paths. In particular, during a first pass it is assumed that instructions 0 to 6 are fetched and decoded but that the sixth instruction is a branch instruction that is taken, and accordingly instruction 7 is not fetched and decoded at that time. Whilst the target address of the branch instruction could potentially be elsewhere within the code, for ease of illustration it is assumed that the branch instruction branches back to instruction 1, and accordingly it is then necessary to fetch instructions 1 to 7 for the same fetch granule. Since the decoded instruction cache 50 will not contain all of the instructions required for the second path, then those instructions are decoded by the decode circuitry 25, and in accordance with a technique that did not employ the merging mechanism described herein this would result in the separate allocations illustrated in FIG. 9B. In particular, a first cache line within a set will store the decoded instructions mop0 to mop6 generated as a result of the first path, and a separate cache line within the same set will store the decoded instructions mop to mop7 associated with the second path through the fetch granule. However, as shown in FIG. 9C, when using the techniques described herein, the merge condition can be detected, and the existing allocated cache line for the first path can be updated so as to incorporate the newly decoded instruction mop7, thereby causing full utilisation of the allocated cache line to take place.

From a review of FIGS. 8A to 8C and 9A to 9C, it will be appreciated that in both examples, without the merging mechanism described herein, the storage efficiency would drop to 50%, due to two different cache lines being allocated for instructions from the same fetch granule. Whilst in the example of FIGS. 8A to 8C, there is no redundant code, in FIGS. 9A to 9C there is redundant code in that the decoded instructions mop1 to mop6 have been allocated twice, in two different cache lines. It will be appreciated from the above discussion that the technique described herein can significantly improve the efficiency of utilisation of the available resources within the decoded instruction cache, for both exclusive paths through a particular fetch granule and partially exclusive paths through a particular fetch granule.

By using the techniques described herein, the effective capacity of the decoded instruction cache increases. This enables an apparatus to be designed with a smaller decoded instruction cache in order to reach a given performance point, or to have higher performance for a given decoded instruction cache storage budget.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:
1. An apparatus comprising:
fetch circuitry to fetch instructions from memory, where each instruction is from a fetch granule comprising P instructions at sequential addresses in the memory, where P is an integer greater than one;
decode circuitry to decode fetched instructions in order to produce a stream of decoded instructions for execution by execution circuitry;
a decoded instruction cache to store decoded instructions produced by the decode circuitry, the decoded instruction cache comprising a plurality of cache blocks, where each cache block is arranged to store decoded instructions from at least one fetch granule allocated to that cache block, for each fetch granule allocated to the cache block the cache block being able to store up to P decoded instructions from that fetch granule, wherein when the corresponding decoded instruction for a required instruction for execution by the execution circuitry is already stored in the decoded instruction cache, the corresponding decoded instruction from the decoded instruction cache is output in the stream of decoded instructions; and
allocation circuitry to allocate cache blocks for storing the decoded instructions, the allocation circuitry being arranged, when a cache block is already allocated for a number of existing decoded instructions from a particular fetch granule due to a first path through the particular fetch granule being taken, and then a number of additional decoded instructions from that particular fetch granule are subsequently produced by the decode circuitry due to a second path different to the first path being taken through the particular fetch granule, to update the already allocated cache block to provide both the existing decoded instructions and the additional decoded instructions.

2. An apparatus as claimed in claim 1, wherein the fetch circuitry is arranged, when the corresponding decoded instruction for the required instruction is already stored in the decoded instruction cache, to inhibit forwarding that required instruction to the decode circuitry.

3. An apparatus as claimed in claim 1, further comprising detection circuitry arranged, for one or more decoded instructions from a fetch granule that are to be allocated into the decoded instruction cache, to detect when a cache block is already allocated for decoded instructions from that fetch granule.

4. An apparatus as claimed in claim 3, further comprising:
access control circuitry arranged to perform a lookup operation to determine whether the corresponding decoded instruction for the required instruction is already stored in the decoded instruction cache;
wherein the detection circuitry is provided by the access control circuitry and is arranged during the lookup operation to detect a merge condition when the cache block has already been allocated for decoded instructions from the fetch granule of the required instruction but that already allocated cache block omits the corresponding decoded instruction for the required instruction; and
wherein the detection circuitry is arranged to notify the allocation circuitry when the merge condition is detected, and the allocation circuitry is arranged in the presence of the merge condition to update the already allocated cache block to provide both the existing decoded instructions and the additional decoded instructions once the additional decoded instructions have been produced by the decode circuitry.

5. An apparatus as claimed in claim 3, wherein:
the detection circuitry is provided by the allocation circuitry and is arranged to perform a lookup operation within the decoded instruction cache in order to detect a merge condition when a cache block has already been allocated for decoded instructions from the particular fetch granule, the allocation circuitry being arranged in the presence of the merge condition to update the allocated cache block to provide both the existing decoded instructions and the additional decoded instructions.

6. An apparatus as claimed in claim 1, wherein the allocation circuitry comprises:
adjustment circuitry arranged, when the already allocated cache block is to be updated to provide both the existing decoded instructions and the additional decoded instructions, to discard from the additional decoded instructions any decoded instruction also provided by the existing decoded instructions and to then shift remaining additional decoded instructions so as to align the remaining additional decoded instructions with associated available locations within the already allocated cache block;
wherein the allocation circuitry is responsive to the adjustment circuitry to perform a merge operation to populate the associated available locations with the remaining additional decoded instructions whilst retaining the existing decoded instructions within the already allocated cache block.

7. An apparatus as claimed in claim 6, wherein the existing decoded instructions occupy a first series of locations within the already allocated cache block, and the associated available locations are a second series of locations non-overlapping with the first series of locations.

8. An apparatus as claimed in claim 7, wherein a first location of the second series is adjacent to a final location of the first series.

9. An apparatus as claimed in claim 6, wherein the allocation circuitry is arranged to update the already allocated cache block to provide both the existing decoded instructions and the additional decoded instructions when the remaining additional decoded instructions are sufficient to populate all locations within the already allocated cache block unoccupied by the existing decoded instructions.

10. An apparatus as claimed in claim 1, wherein when a new cache block is initially allocated for a number of decoded instructions from a given fetch granule, those decoded instructions are located in consecutive locations of the new cache block starting from an initial location.

11. An apparatus as claimed in claim 1, wherein the decoded instruction cache is an X-way set associative cache, where each set comprises one cache block in each of the X ways, and each set is associated with multiple fetch granules such that decoded instructions from any of those multiple fetch granules are allocated to one of the cache blocks in the associated set.

12. An apparatus as claimed in claim 1, wherein the first path and second path are exclusive paths, such that the instructions in the first path are non-overlapping with the instructions in the second path.

13. An apparatus as claimed in claim 1, wherein the first path and second path are partially exclusive paths, such that a subset of the instructions in the first path is non-overlapping with a subset of the instructions in the second path.

14. An apparatus as claimed in claim 1, wherein the decode circuitry comprises M decoders, and the execution circuitry comprises N execution units, where N>M, where N is an integer greater than one and M is an integer greater than zero.

15. An apparatus as claimed in claim 1, wherein the fetch circuitry is arranged to fetch instructions in blocks, and to pass those blocks of instructions to the decode circuitry for decoding, each block of the blocks of instructions comprising between 1 and P instructions from a given fetch granule.

16. An apparatus as claimed in claim 15, wherein the fetched instructions are dependent on an instruction flow through a computer program, the instruction flow being such that different paths are taken through at least one fetch granule that is encountered multiple times during the instruction flow.

17. An apparatus as claimed in claim 1, wherein the fetch circuitry is arranged, when for a block of required instructions from a given fetch granule the corresponding decoded instructions are already stored in the decoded instruction cache, to cause the decode circuitry to be bypassed for the block of required instructions and to instead cause the corresponding decoded instructions from the decoded instruction cache to be output in the stream of decoded instructions.

18. A method of decoding instructions comprising:
fetching instructions from memory, where each instruction is from a fetch granule comprising P instructions at sequential addresses in the memory, where P is an integer greater than one;
employing decode circuitry to decode fetched instructions in order to produce a stream of decoded instructions for execution by execution circuitry;
storing within a decoded instruction cache decoded instructions produced by the decode circuitry, the decoded instruction cache comprising a plurality of cache blocks, where each cache block is arranged to store decoded instructions from at least one fetch granule allocated to that cache block, for each fetch granule allocated to the cache block the cache block being able to store up to P decoded instructions from that fetch granule;

when the corresponding decoded instruction for a required instruction for execution by the execution circuitry is already stored in the decoded instruction cache, outputting the corresponding decoded instruction from the decoded instruction cache in the stream of decoded instructions;

performing an allocation operation to allocate cache blocks for storing the decoded instructions; and when a cache block is already allocated for a number of existing decoded instructions from a particular fetch granule due to a first path through the particular fetch granule being taken, and then a number of additional decoded instructions from that particular fetch granule are subsequently produced by the decode circuitry due to a second path different to the first path being taken through the particular fetch granule, the allocation operation comprises updating the already allocated cache block to provide both the existing decoded instructions and the additional decoded instructions.

19. An apparatus comprising:

fetch means for fetching instructions from memory, where each instruction is from a fetch granule comprising P instructions at sequential addresses in the memory, where P is an integer greater than one;

decode means for decoding fetched instructions in order to produce a stream of decoded instructions for execution by execution means;

decoded instruction means for storing decoded instructions produced by the decode means, the decoded instruction means comprising a plurality of cache blocks, where each cache block is arranged to store decoded instructions from at least one fetch granule allocated to that cache block, for each fetch granule allocated to the cache block the cache block being able to store up to P decoded instructions from that fetch granule, wherein when the corresponding decoded instruction for a required instruction for execution by the execution means is already stored in the decoded instruction means, the corresponding decoded instruction from the decoded instruction means is output in the stream of decoded instructions; and allocation means for allocating cache blocks for storing the decoded instructions, the allocation means being arranged, when a cache block is already allocated for a number of existing decoded instructions from a particular fetch granule due to a first path through the particular fetch granule being taken, and then a number of additional decoded instructions from that particular fetch granule are subsequently produced by the decode means due to a second path different to the first path being taken through the particular fetch granule, to update the already allocated cache block to provide both the existing decoded instructions and the additional decoded instructions.

* * * * *